Feb. 14, 1939.  E. DURR  2,147,193
DITCHER
Filed Jan. 26, 1937
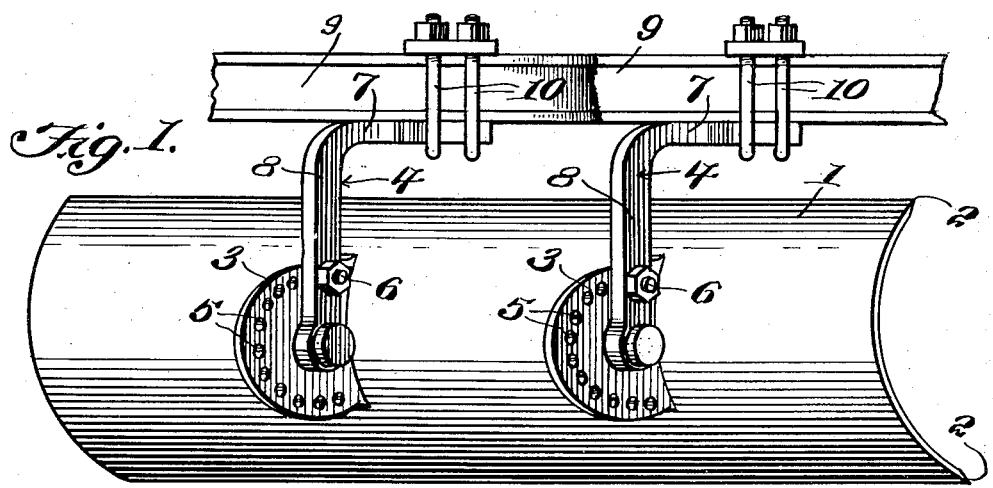
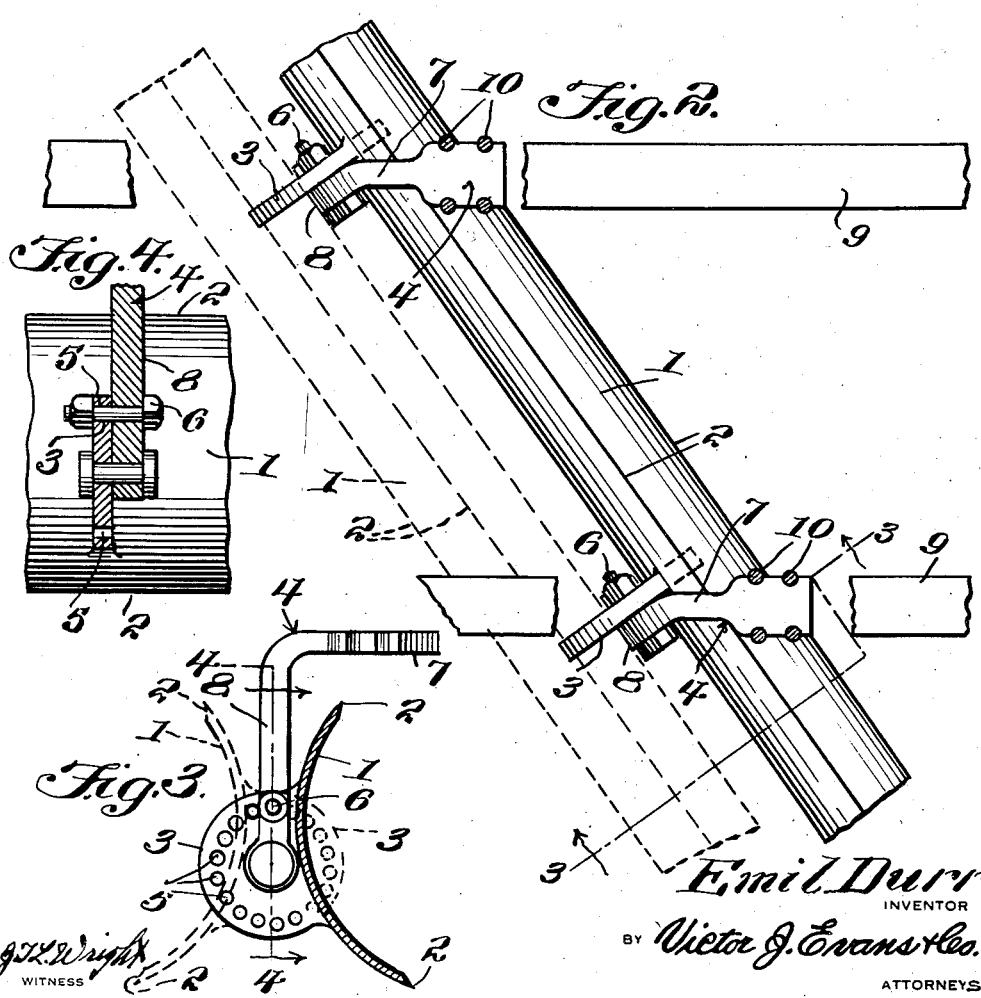
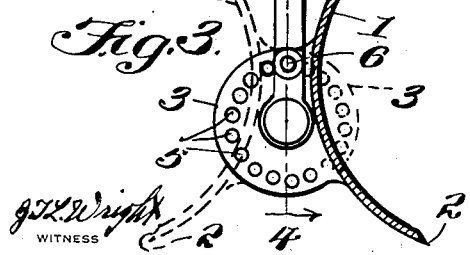
Emil Durr
INVENTOR
BY Victor J. Evans & Co.
ATTORNEYS Patented Feb. 14, 1939

2,147,193

UNITED STATES PATENT OFFICE 2,147,193

DITCHER

Emil Durr, Choteau, Mont.

Application January 26, 1937, Serial No. 122,473

1 Claim. (Cl. 37—177)

This invention relates to a ditcher which may be constructed at a very low cost and has for the primary object the provision of a scraper blade and a mounting therefor which will permit the blade to be readily adapted to the beams of a plow and permit the blade to be adjusted as desired.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a blade and its mountings and constructed in accordance with my invention.

Figure 2 is a top plan view partly in section illustrating the same.

Figure 3 is a sectional view taken on the line 3—3 of Figure 2.

Figure 4 is a sectional view taken on the line 4—4 of Figure 3.

Referring in detail to the drawing, the numeral 1 indicates a digger blade especially adapted for cleaning and digging ditches. The blade 1 is of any selected length and is transversely curved and has opposite edges thereof sharpened to provide cutting edges 2. Formed on the convex face of the blade are relatively spaced plates 3 to which are pivoted attaching arms 4. The plates 3 are also provided with a series of openings 5. Bolts 6 are carried by the arms 4 and may be passed through any one of the openings 5 whereby the angle of the blade with respect to the supporting arms may be varied or to permit the blade to be reversed from one side of the arms to the other side thereof.

The arms 4 include angularly related portions 7 and 8. The portions 7 and 8 are disposed at substantially right angles to each other while each portion 7 is curved or bent slightly laterally of the portion 8. Said portions 8 are pivoted to the plates 3 while the portions 7 are secured to beams 9 by U clamps 10. The beams 9 form part of a conventional type of plow whereby said plow may be readily converted or used for digging and cleaning ditches at a very nominal cost.

What is claimed is:

A ditch digger comprising a blade transversely curved and having opposite edges sharpened to provide cutting edges, disc-like plates having cutaway portions to shape said plates to conform to the contour of the blade and secured thereon and provided with openings grouped in semicircular rows, arms pivoted on said plates and including angularly related portions, means for securing said arms on beams of a plow, and bolts carried by said arms to extend through any of said openings for adjusting the blade relative to the arms, each of said rows fashioned with a pair of oppositely disposed end openings arranged in proximity to said blade whereby adjustment of said bolts in the openings at one end of said rows serves to position said blade on one side of said arms and adjustment of said bolts in the openings at the opposite ends of said rows serves to position said blade on the opposite side of said arms.

EMIL DURR.